United States Patent
Johnson et al.

(10) Patent No.: US 7,543,059 B2
(45) Date of Patent: Jun. 2, 2009

(54) PAGE-VIEW RECORDING WITH CLICK-THRU TRACKING

(75) Inventors: Jeffrey V. Johnson, Woodinville, WA (US); Thomas F. Fakes, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 244 days.

(21) Appl. No.: 11/218,803

(22) Filed: Sep. 2, 2005

(65) Prior Publication Data

US 2006/0015614 A1      Jan. 19, 2006

Related U.S. Application Data

(63) Continuation of application No. 09/848,723, filed on May 2, 2001, now Pat. No. 7,047,294.

(51) Int. Cl.
    *G06F 15/16*     (2006.01)
(52) U.S. Cl. .................. 709/225; 709/224; 709/226; 709/218; 709/219
(58) Field of Classification Search .......... 709/224, 709/203, 225, 226, 218, 219
    See application file for complete search history.

(56) References Cited

U.S. PATENT DOCUMENTS

| | | | |
|---|---|---|---|
| 6,018,619 A * | 1/2000 | Allard et al. ............... 709/224 |
| 6,606,657 B1 | 8/2003 | Zilberstein et al. | |
| 6,785,723 B1 * | 8/2004 | Genty et al. ............... 709/224 |
| 6,826,594 B1 | 11/2004 | Pettersen | |
| 6,859,833 B2 * | 2/2005 | Kirsch et al. ............... 709/224 |
| 2001/0054059 A1 * | 12/2001 | Marks et al. ............... 709/201 |
| 2002/0116494 A1 | 8/2002 | Kocol | |
| 2003/0046238 A1 * | 3/2003 | Nonaka et al. ............... 705/51 |
| 2003/0046385 A1 | 3/2003 | Vincent | |
| 2004/0249938 A1 | 12/2004 | Bunch | |
| 2004/0260807 A1 | 12/2004 | Glommen et al. | |
| 2005/0188318 A1 | 8/2005 | Tamir et al. | |

FOREIGN PATENT DOCUMENTS

WO     WO 02/17205     2/2002

* cited by examiner

*Primary Examiner*—William C Vaughn, Jr.
*Assistant Examiner*—Djenane M Bayard
(74) *Attorney, Agent, or Firm*—Lee & Hayes, PLLC

(57) ABSTRACT

Page-view recording with click-thru tracking is described. In an embodiment, a tracking system receives a request for content that includes request-tracking information. The request-tracking information designates that the tracking system receive the content request before the request is communicated to a content provider. The request for content is communicated to the content provider that provides the content. The content includes content-tracking information that the tracking system receives from a requesting device when the content is provided to the requesting device. The tracking system maintains the request-tracking and the content-tracking information, and associates the request-tracking and the content-tracking information with the destination device.

19 Claims, 7 Drawing Sheets

| UserID / DeviceID | PV / CT | Content Source | Client Source | Page Value | Page Name / Content ID |
|---|---|---|---|---|---|
| 402 User | PV | Provider | Previous Content | Home | Page A |
| 404 User | CT | Provider | Page A | Nav. Section | Page B |
| 406 User | PV | Provider | Page A | Home | Page B |
| 408 User | CT | Provider | Page B | Content Section | Page C |
| 410 User | PV | Provider | Page B | Home | Page C |

PAGE-VIEW RECORDING WITH CLICK-THRU TRACKING

RELATED APPLICATIONS

This application is a continuation of and claims priority to U.S. patent application Ser. No. 09/848,723 entitled "Page-View Recording with Click-Thru Tracking" filed May 2, 2001 to Johnson et al., the disclosure of which is incorporated by reference herein.

BACKGROUND

Conventional information tracking systems have limitations that preclude obtaining meaningful customer and visitor analysis information pertaining to Web sites. In particular, useful analysis information about a request for a Web site, and analysis information associated with a data request initiated at a Web site, either can not be determined or obtained with conventional systems, or can not be determined or obtained without an impact to a customer of a particular Web site.

FIG. 1 illustrates a conventional tracking system 100 to record that a Web page has been requested for viewing by a user. Tracking system 100 has a client computing device 102 connected to a display device 104. The display device 104 displays a Web page 106 having a selectable data link 108, such as a hyperlink.

The client computing device 102 is connected to a Web page server 110 via a network connection 112, such as the Internet. Web page server 110 provides Web page structure 114, and information for display within the Web page structure. Web page structure 114 includes a standard script redirect function 116 that generates tracking information when the Web page is requested. The Web page server 110 is connected, or includes, a data storage device 118 that stores the tracking information.

When a user of the client computing device 102 selects the link 108 within Web page 106, client computing device 102 communicates a request for Web page 114 to Web page server 110. The redirect function 116, which is implemented at Web pager server 110, generates tracking information to indicate that Web page structure 114 has been requested, and where the request came from.

With the conventional tracking system 100, each section of Web page structure 114 is recorded in the data storage device 118 as a separate data record, and each section is associated with the user of client computing device 102. That is, all of the page sections (also commonly referred to as "page views") for a particular requested Web page are logged with the tracking system 100, and each page section is associated with the user request for the Web page. This only identifies that the user of client computing device 102 requested Web page 114.

With conventional tracking system 100, information pertaining to selectable link 108, Web page 106, and a location of selectable link 108 within Web page 106 is not determinable. Additionally, a response to the user's request for Web page 114 is delayed when script function 116 has to first determine the tracking information, and initiate the tracking information being stored at data storage device 118.

SUMMARY

This summary is provided to introduce simplified concepts of page-view recording with click-thru tracking which is further described below in the Detailed Description. This summary is not intended to identify essential features of the claimed subject matter, nor is it intended for use in determining the scope of the claimed subject matter.

In an embodiment of page-view recording with click-thru tracking, a tracking system receives a request for content that includes request-tracking information. The request-tracking information includes identifiers for the content, a content provider, a destination device for the content, a selectable data link that generates the request, rendered content that includes the data link, and a location of the data link within the rendered content. Additionally, the request-tracking information designates that the tracking system receive the request for content before the request is communicated to a designated content provider. The request-tracking information is stored in a tracking information database, and the request-tracking information is associated with the device requesting the content and/or with a user of the requesting device.

In another embodiment of page-view recording with click-thru tracking, The request for content is communicated to the content provider that is designated in the content request to provide the content. The content provider provides the content to the requesting device. The content includes content-tracking information that includes identifiers for the content provider, the destination device, and the content. The tracking system receives the content-tracking information from the destination device when the content is provided to and/or rendered at the destination device. The content-tracking information is stored in the tracking information database, and the content-tracking information is associated with the destination device and/or with a user of the destination device.

BRIEF DESCRIPTION OF THE DRAWINGS

The same numbers are used throughout the drawings to reference like features and components.

DETAILED DESCRIPTION

Introduction

The following describes systems and methods for page-view recording with click-thru tracking. Tracking information provides an insight as to how customers and visitors to a Web site, for example, respond to content presented for viewing. The tracking information can be analyzed to determine how to better design and present the content, such as for the layout of a Web page, taking into consideration business and marketing decisions. Being able to determine not only the content that a viewer sees, but also how a viewer perceives the content is valuable marketing and business information.

Exemplary Content and Request Information Tracking System

Figure 1:
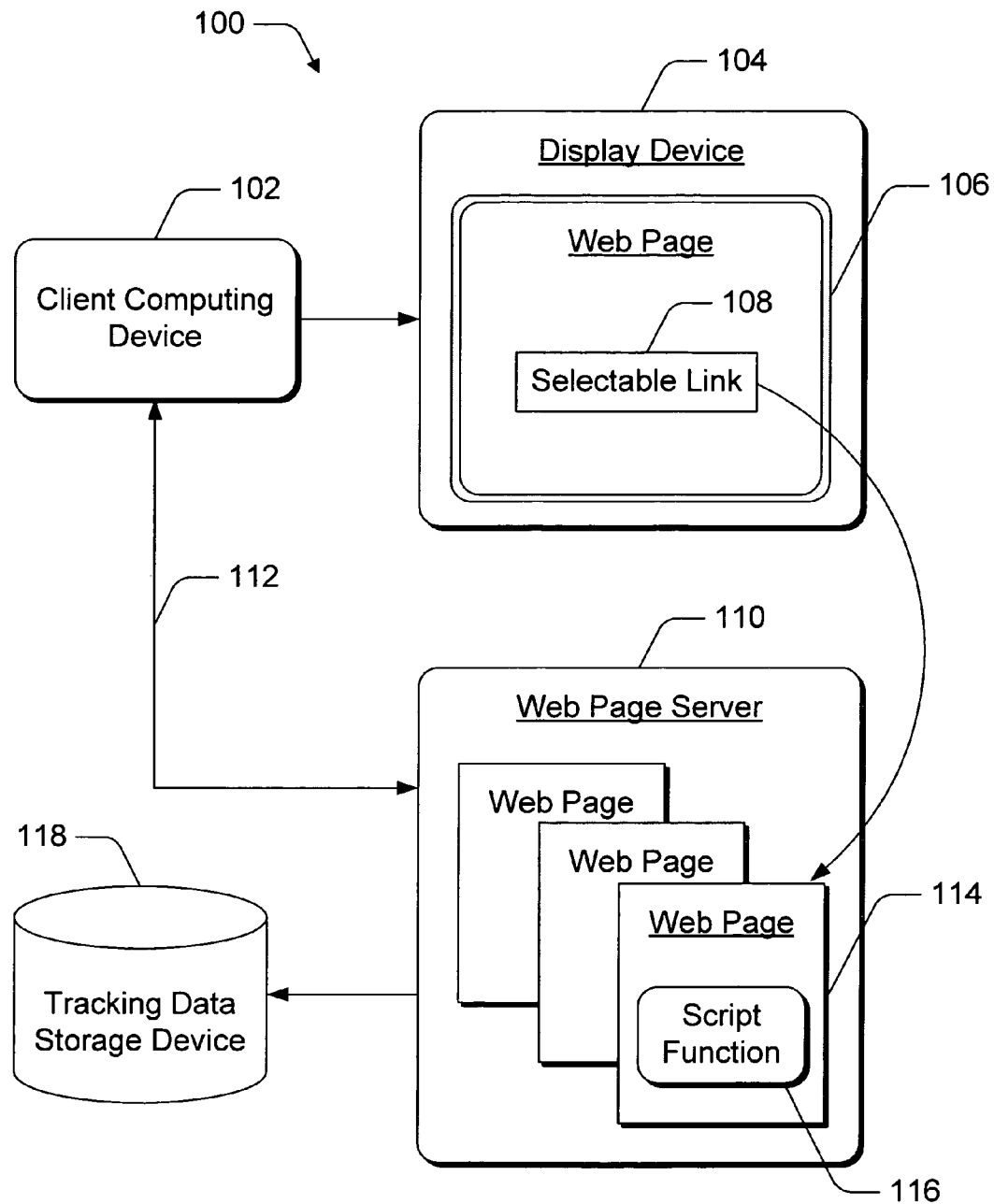
FIG. 1 is a block diagram of a conventional tracking system for a Web page request.
Figure 2:
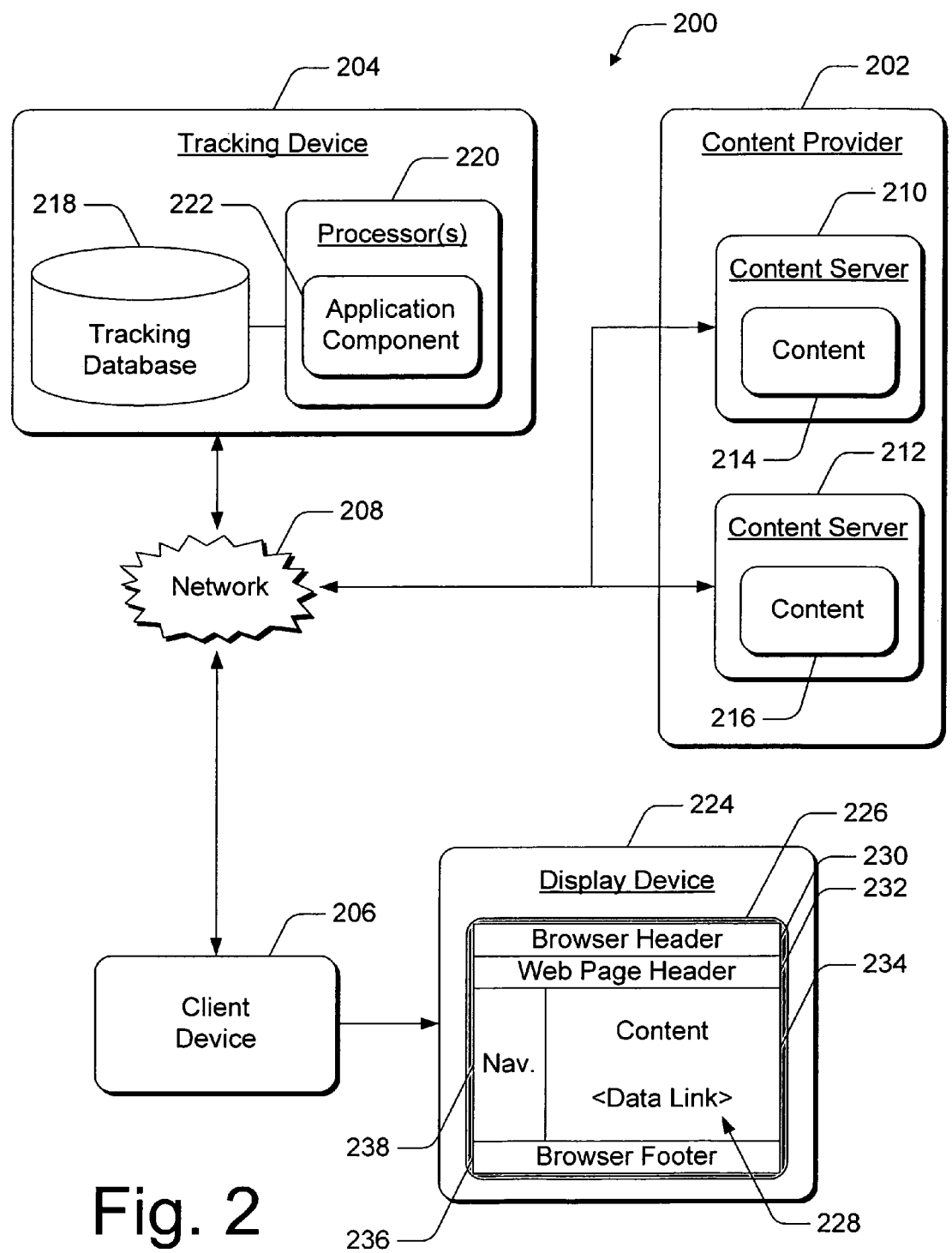
FIG. 2 is a block diagram that illustrates a content and request information tracking system.

FIG. 2 illustrates a content and request information tracking system 200 having components that can be implemented within a computing device, or the components can be distributed within a computing system having more than one computing device. Information tracking system 200 includes a content provider 202, a tracking device 204, a client device 206, and a network 208. See the description of "Exemplary Computing System and Environment" below for specific examples and implementations of networks, computing systems, computing devices, and components that can be used to implement the invention described herein.

Network 208 can be any type of network, such as a local area network (LAN) or a wide area network (WAN), using any type of network topology and any network communication protocol. Furthermore, network 208 can represent a combination of two or more networks. In this example, network 208 includes logical connections to facilitate data communication between the content provider 202, the tracking device 204, and the client device 206.

Content provider 202 includes content servers 210 and 212 that maintain and provide content 214 and 216, respectively. Content 214 and 216 can be any type of data, content, Web pages, and the like that is provided by a server system when requested, such as from a particular Web site. Content 214 and 216 is maintained in one or more data storage components (not shown). Content provider 202 can also include tracking device 204.

Tracking device 204 includes a tracking database 218 that is a data storage component to maintain tracking information. Tracking database 218 can be implemented as RAM (random access memory), a disk drive, a floppy disk drive, a CD-ROM drive, or any other component utilized for data storage. Furthermore, those skilled in the art will recognize that tracking device 204 and content servers 210 and 212 can each be implemented as multiple server devices in a distributed computing environment, where each server device can have multiple data storage components.

Tracking device 204 also includes one or more processors 220 to process various instructions to control the operation of the tracking server. An application component 222 executes on processor(s) 220 to process tracking information that will be routed for storage to the tracking database 218. The application component 222 can be implemented as an ISAPI filter (Internet Server Application Program Interface) that executes as part of an Internet server application. An ISAPI filter is an example of a dynamic link library application file that can be executed as part of an HTTP (Hypertext Transfer Protocol) application process. Furthermore, an ISAPI filter can be designed to receive control for HTTP requests, and can be created for such purposes as logging information, request screening, and for other purposes.

Client device 206 is connected to a display device 224 which is shown having rendered content 226 displayed on the device. Rendered content 226 can be a Web page, for example, that is created and displayed with HTML (Hypertext Markup Language). A Web page designed with HTML contains text and specifications about where image or other multimedia files are located when the page is displayed. Each Web page is an individual HTML file with its own Web address which is a URL (Uniform Resource Locator). A Web page can be created to support multiple frames which designates that multiple pages, or HTML files, can be downloaded to a browser application and presented on designated sections of the display screen at the same time.

Rendered content 226 includes a selectable data link 228 and various sections and/or frames. The selectable data link 228 can be a hyperlink, in the case of a Web page, or any other type of selectable connection that generates a request for content when selected by a user of the client device 206. The various sections of the rendered content 226 can include a browser header 230, a Web page header 232 (in the case of the rendered content being a Web page), a content section 234, a browser footer 236, and a navigation section 238. Although only one selectable data link 228 is shown in the content section 234, data links can be located within any of the rendered content sections, and particularly in the navigation section 238. In the case of a Web page, data links in navigation section 238 "navigate" a user of the client device 206 to other Web pages and/or Web sites.

The information tracking system 200 can be implemented to obtain tracking information associated with a request for content, and tracking information associated with providing the content. Obtaining request-tracking information associated with a request for content is described below as "Click-thru Tracking". Obtaining content-tracking information associated with providing content is described below as "Page-view Recording".

Click-thru Tracking

Click-thru tracking provides request-tracking information when content is requested via a selectable data link within rendered content. For example, when a user of client device 206 selects data link 228 from the rendered content 226, a request for content, such as a new Web page, is generated. A content request can be initiated by user interaction with client device 206, or the request can be initiated by an application executing on the client device.

A content request is encoded with, or includes, request-tracking information. The request-tracking information identifies the content requested, such as a new Web page, the rendered content page from which the content request originated, the data link that was selected to initiate the content request, and the section of the rendered content page that the data link is located in. For example, a content request initiated with data link 228 includes request-tracking information that identifies the content requested, and that the content request originated with data link 228 located in the content section 234 of rendered content 226.

Tracking device 204 receives a content request from client device 206 and application component 222 processes the request. The request-tracking information included with the content request designates that the request be redirected such that tracking device 204 receives the content request before the request is routed, or otherwise communicated, to a designated content provider.

The request-tracking information is received by tracking device 204 structured as an HTTP URL for a click-thru record that is maintained with tracking database 218. Following is an example of a URL structure for a click-thru record:

http://TrackingSever.com/CT/ContentSource/Client-
        Source/PageValue/ContentID.htm? page=http://
        ContentProvider.com/ContentServer/content.htm The URL structure for a click-thru record includes a tracking server identifier, "http://TrackingSever.com", that identifies where to redirect a content request. In this instance, the content request is redirected to tracking device 204. The tracking information is identified as a click-thru record with the "CT" identifier.

A content source identifier, "ContentSource", identifies the content provider that provided the content from which the content request is generated. For example, if content provider 202 originally provided rendered content 226 to client device 206, then content provider 202 would be identified as the content source.

A client source identifier, "ClientSource", differentiates between different versions of a particular application, or between different applications that provide the same service, at the content requesting device. For example, rendered content 226 at client device 206 can be a media application implemented as an independent application having a user interface through which a user can initiate a request for video content from content provider 202. Client device 206 can similarly display the media user interface within an Internet browser application on display device 224, and the user can initiate a request for the same video content using data link 228. The client source identifier can be encoded to differentiate between the independent application, or the Internet browser version.

A content page identifier, "PageValue", is a character and/or number code that corresponds to a table entry maintained in a page value table (not shown) in the tracking device 204. An example of a PageValue is "HOME0F1G1", which has a format of $$$$#AALL, where "$$$$" identifies a home page, "#" identifies the page level (where 0 is the top level page, or home page), "AA" is an area identifier that identifies a feature on the page (where F1 identifies a first feature on the page), and "LL" further identifies an aspect of the area identified by "AA" (where G1 indicates a first graphic associated with the first feature F1). The "LL" identifier can also designate a link type, such as a graphic link, navigation link, content link, or any other similar link type.

A content identifier, "ContentID", identifies the requested content, and the URL structure is appended with a URL, that designates the content provider having the requested content. For example, the URL structure includes "page=http://ContentProvider.com/ContentServer/content.htm", which designates that the requested content 214 is maintained by content provider 202 in content server 210.

Those skilled in the art will recognize that the URL structure for a click-thru record, and the combination of included identifiers, is merely an example to illustrate click-thru tracking. Any combination of identifiers can be created and defined to be included with request-tracking information as described herein.

The application component 222 processes a content request to obtain the tracking information for a click-thru record, and communicates with the tracking database 218 to store the tracking information. Tracking device 204 logs the tracking information into the tracking database 218, and then passes the content request on to the designated content provider. The content provider is identified by the designator appended to the URL structure (e.g., "page=http://<URL of content provider>" in the above example).

If a content request is initiated at client device 206, and communicated to tracking device 204, but tracking device 204 cannot process the request without a noticeable delay to client device 206, the content request is routed to the designated content provider (e.g., content provider 202) without processing the request-tracking information. That is, if tracking device 204 is too busy to process the tracking information, the requesting device will not be impacted with a slow response to the request.

With information tracking system 200, a user initiating a content request is not aware of the click-thru tracking because the request-tracking information is encoded, or otherwise associated, with the content request. A Web page, or rendered content 226, already has the necessary redirection and navigation information associated with each data link 228 within the page.

Page-view Recording

Page-view recording provides content-tracking information when requested content is provided and/or rendered at a requesting device. For example, when a user of client device 206 requests new content, such as a new Web page, to replace rendered content 226, content provider 202 provides the new content 214 from content server 210. Content provider 202 provides the requested content and includes content-tracking information encoded with the content.

Content-tracking information provided with a requested Web page is encoded with the Web page as a URL. Those skilled in the art will recognize that a Web page can be programmed, or otherwise created, to include encoded information and instructions for determining and generating the content-tracking information, and for routing the content-tracking information after the requested Web page is provided to a destination device. The implementation of content-tracking information is such that any browser version can implement page-view recording.

When client device 206 receives new content 214, and the included content-tracking information, the content is displayed, or otherwise rendered, on display device 224. When the new content is fully rendered on the display, the content-tracking information is communicated to tracking device 204 to indicate that the new content has been fully rendered at the destination device (e.g., client device 206). Alternatively, the content-tracking information can be communicated to tracking device 204 to indicate that the content has been provided to the destination device, but is only partially rendered, such as when a user selects a data link from a section of the page that has been rendered, but before the entire page is rendered.

Tracking device 204 receives the content-tracking information from client device 206 and application component 222 processes the information. The content-tracking information is received by tracking device 204 structured as an HTTP URL for a page-view record that is maintained with tracking database 218. Following is an example of a URL structure for a page-view record:

http://TrackingSever.com/PV/ContentSource/ClientSource/PageValue/PageName.htm

The URL structure for a page-view record includes a tracking server identifier, "http://TrackingSever.com" that identifies where to route the content-tracking information after the requested content is provided to a destination device (e.g., client device 206). The tracking information is identified as a page-view record with the "PV" identifier. A content source identifier, "ContentSource", identifies the content provider of the requested content, which in this example is content provider 202.

A client source identifier, "ClientSource", identifies the rendered content at the content requesting device, such as rendered content 226 at client device 206. The rendered content 226 can be a media application implemented as an independent application having a user interface through which a user can initiate a request for video content from content provider 202. Client device 206 can similarly display the media user interface within an Internet browser application and the user can initiate a request for the same video content using data link 228. The client source identifier can be encoded to differentiate between the independent application, or the Internet browser version. Additionally, the client source identifier can be encoded to designate which version of a particular software application is implemented by the requesting client device.

A content page identifier, "PageValue", is a character and/or number code that corresponds to a table entry maintained in a page value table (not shown) in the tracking device 204. The page value can be referenced in the page value table to identify which Web page and in what format the Web page was requested. A content identifier, "PageName", identifies the requested content.

Those skilled in the art will recognize that the URL structure for a page-view record, and the combination of included identifiers is merely an example to illustrate page-view recording. Any combination of identifiers can be created and defined to be included with content-tracking information as described herein.

The application component 222 at tracking device 204 processes content-tracking information to obtain the tracking information for a page-view record, and communicates with the tracking database 218 to store the tracking information. Tracking device 204 logs the tracking information into the tracking database 218.

Method for Content and Request Information Tracking

Figure 3:
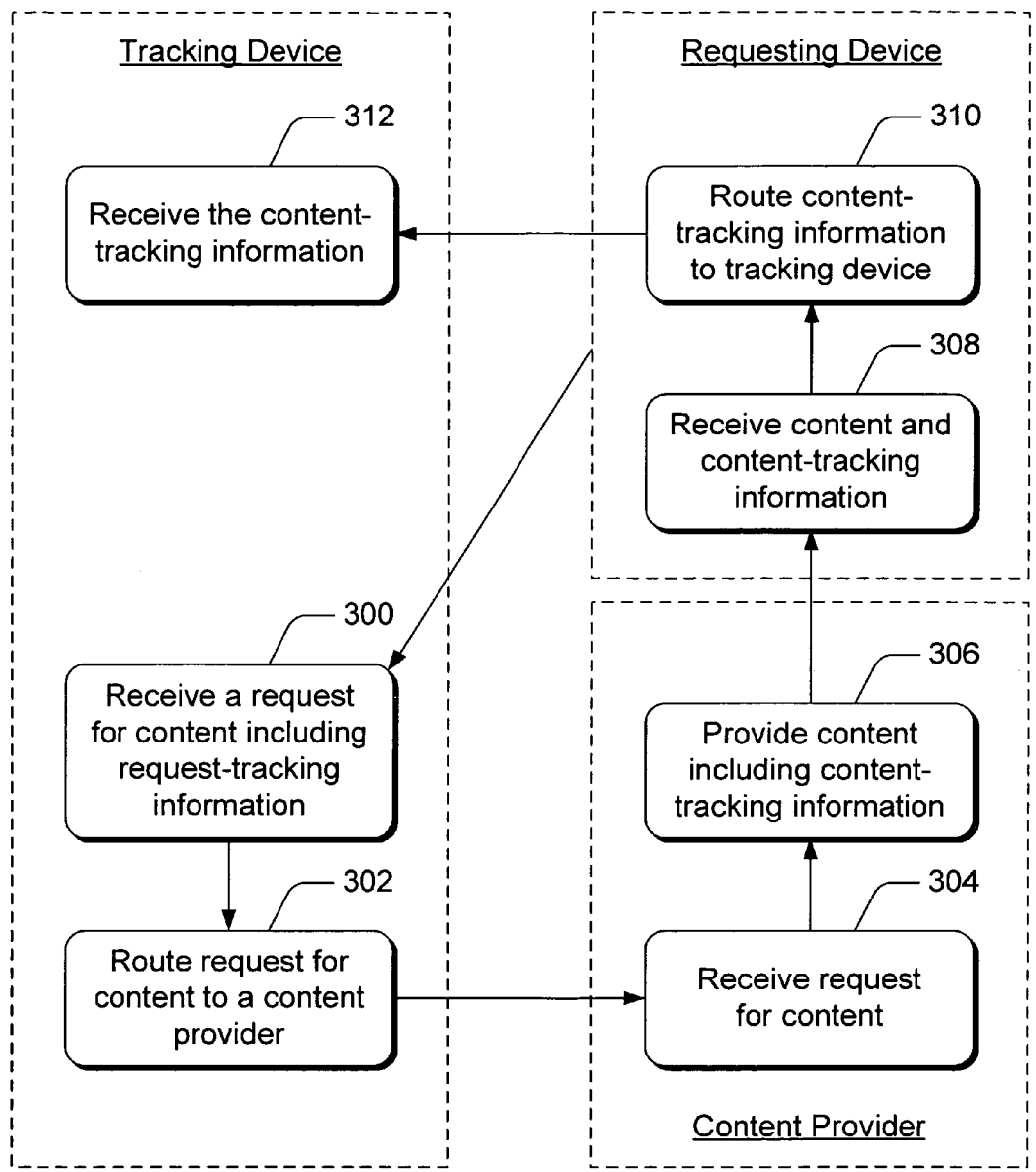
FIG. 3 is a flow diagram of a method for content and request information tracking.

FIG. 3 illustrates a method to describe content and request information tracking, and illustrates components of the information tracking system 200 (FIG. 2). Those skilled in the art will recognize that the components are merely exemplary, and that any number of components can be used to implement content and request information tracking. Furthermore, the tracking device and content provider shown in FIG. 3 can be implemented as the same device. The order in which the method is described is not intended to be construed as a limitation. Furthermore, the method can be implemented in any suitable hardware, software, firmware, or combination thereof.

At block 300, a request for content is received at a tracking device 204, and the request includes request-tracking information. The tracking device 204 can include a database, or similar data storage component, to store and/or maintain the request-tracking information. The request-tracking information designates that the tracking device 204 receive the content request before the content provider 202. The request-tracking information is included with the content request because the request-tracking information is encoded, or otherwise associated, with a selectable data link 228 that initiates the content request at the requesting device 206.

At block 302, the request for content is routed, or otherwise communicated, to the content provider 202 from the tracking device 204. At block 304, the content provider 202 receives the content request. At block 306, the requested content is provided to the requesting device 206, and the content includes content-tracking information. The content-tracking information designates that the tracking device 204 receive the content-tracking information.

At block 308, the requested content is received at the requesting device 206 along with the content-tracking information. At block 310, the content-tracking information is routed, or otherwise communicated, to tracking device 204. The content-tracking information is routed to tracking device 204 when the content is provided to the requesting device 206, and/or when the content is rendered at the requesting device. At block 312, the content-tracking information is received at tracking device 204. The tracking device can store and/or maintain the content-tracking information in a database, or similar data storage component.

FIG. 3 illustrates both page-view recording and click-thru tracking as described above with reference to FIG. 2. However, page-view recording and click-thru tracking can be implemented, or occur, independently. For example, if the selectable data link 228 in rendered content 226 does not have associated request-tracking information, a click-thru record will not be generated by tracking device 204. Rather, if a user at client device 206 initiates a new content request using selectable data link 228, the request will be routed, or otherwise communicated, to content provider 202 without being redirected to tracking device 204. When content provider 202 provides the requested content to client device 206, however, the content will include content-tracking information. The content-tracking information will be communicated to tracking device 204 when the content is provided to and/or rendered at client device 206. Accordingly, a page-view record will be generated by tracking device 204.

Conversely, if the selectable data link 228 in rendered content 226 does have associated request-tracking information, a click-thru record will be generated by tracking device 204. When a user at client device 206 initiates a new content request using selectable data link 228, the request will redirected to tracking device 204. Application component 222 will process the content request to generate a click-thru record for the request, and route the request to a content provider. If the content request designates a different content provider (other than content provider 202) that does not implement or provide tracking information, the content will be provided to requesting device 206 without content-tracking information. Accordingly, a page-view record will not be generated by tracking device 204.

Exemplary Tracking Information Data Structure and Graph

Figures 4, 5:
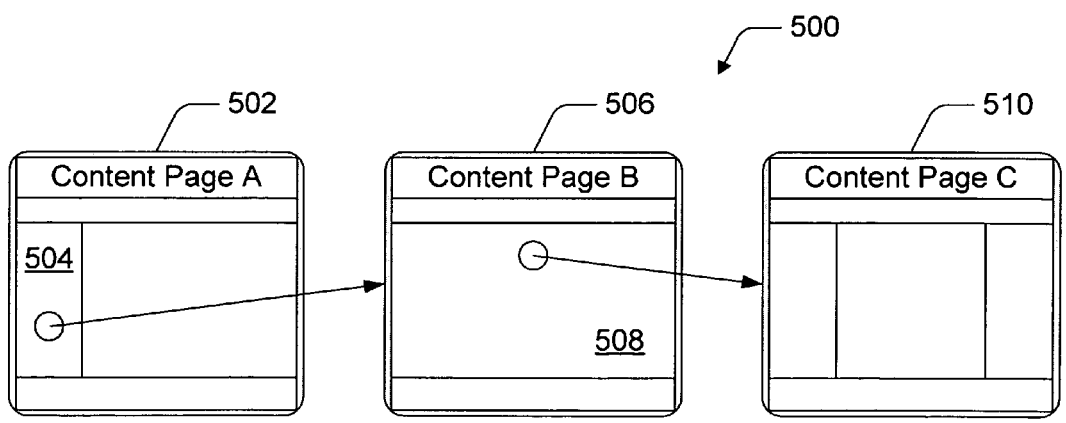
FIG. 4 illustrates a data structure of records that include content and request tracking information.
FIG. 5 illustrates a graphic that can be generated from the information maintained in the data structure shown in FIG. 4.

FIG. 4 illustrates a data structure 400 that includes multiple tracking information records 402 through 410. Records 402, 406, and 410 are examples of page-view records, and records 404 and 408 are examples of click-thru records. Individual tracking information records 402 through 410 include a userID and/or deviceID field 412, a page-view or click-thru record identifier field 414, a content source field 416, a client source field 418, a page value field 420, and a page name or contentID field 422.

Each of the record fields 412 through 422 can contain any numerical or alphanumerical value that uniquely identifies the data in the fields. Additionally, the combination of records and fields shown in data structure 400 is merely an example to illustrate maintaining tracking information. Those skilled in the art will recognize that any combination of records, fields, and data can be created and defined in a data structure.

The userID field 412 identifies that a particular user is associated with each page-view and click-thru record 402 through 410 in data structure 400. The content source field 416 identifies that a particular content provider is also associated with each record 402 through 410.

FIG. 5 illustrates a graphic 500 that can be generated from the information maintained in data structure 400 (FIG. 4). Content page A, identified as 502, corresponds to page-view record 402. When a user initiates a request for page A (page name field 422) from an already rendered page (client source field 418), the content provider (content source field 416) provides the requested content to the user and the page-view record (identifier 414) is generated.

Record 404 corresponds to the user selecting a data link in the navigation section 504 of page 502. Selecting the data link initiates a request for page B (contentID field 422) from an already rendered page A (client source field 418) in the navigation section of page A (page value field 420). FIG. 5 illustrates that initiating a request from the navigation section 504 of page 502 results in content page B, identified as 506.

Content page B corresponds to page-view record 406. When the user initiates a request for page B from the rendered page A, the content provider provides the requested content to the user and page-view record 406 is generated. Record 408 corresponds to the user selecting a data link in the content section 508 of page 506. Selecting the data link initiates a request for page C from the rendered page B in the content section of page B (page value field 420). FIG. 5 illustrates that initiating a request from the content section 508 of page 506 results in content page C, identified as 510, and content page C corresponds to page-view record 410.

Exemplary Application Request Information Tracking System

Figure 6:
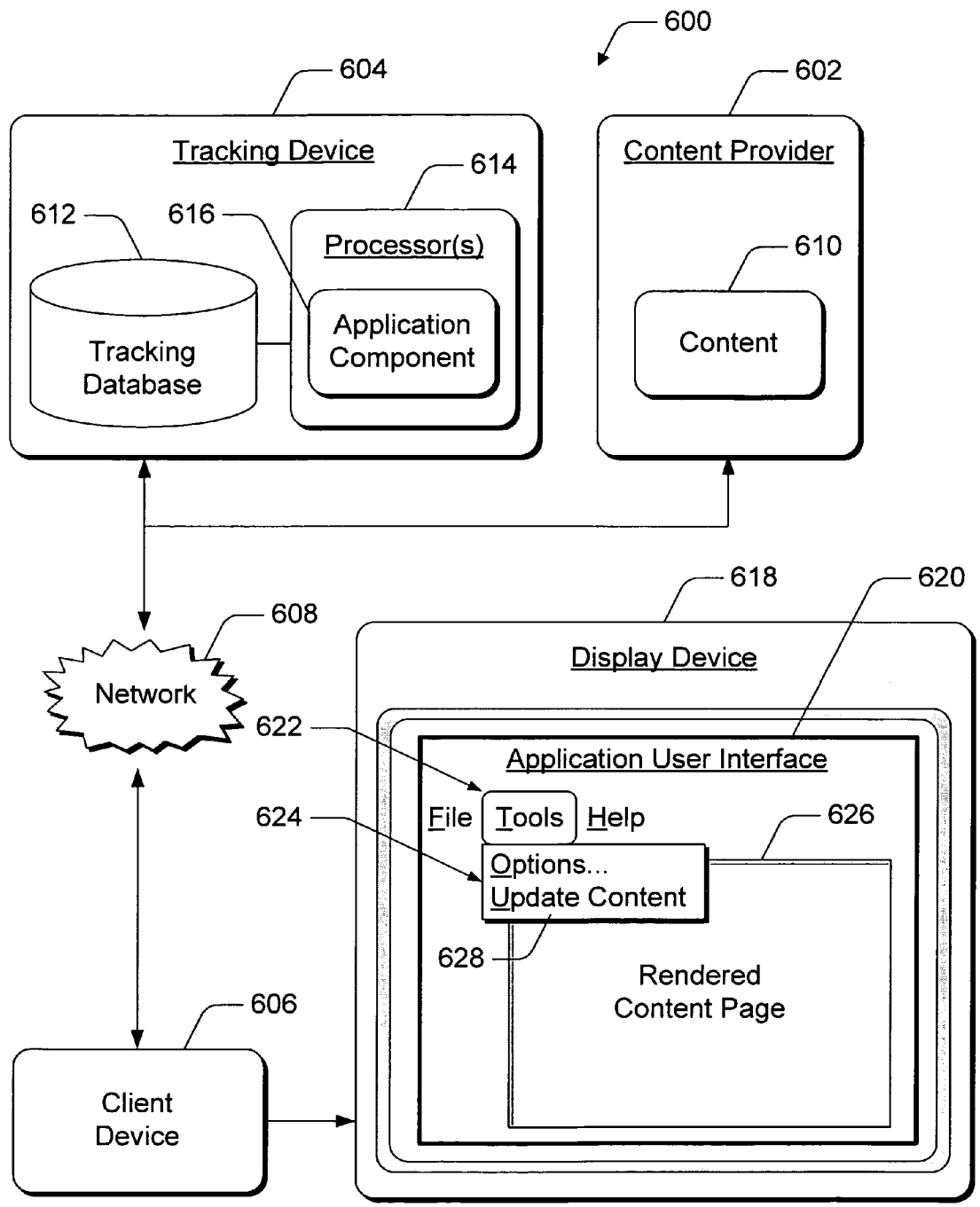
FIG. 6 is a block diagram that illustrates a content and request information tracking system.

FIG. 6 illustrates a content request information tracking system 600 having components that can be implemented within a computing device, or the components can be distributed within a computing system having more than one computing device. Information tracking system 600 includes a content provider 602, a tracking device 604, a client device 606, and a network 608. See the description of "Exemplary Computing System and Environment" below for specific examples and implementations of networks, computing systems, computing devices, and components that can be used to implement the invention described herein.

Network 608 can be any type of network, such as a local area network (LAN) or a wide area network (WAN), using any type of network topology and any network communication protocol. Furthermore, network 208 can represent a combination of two or more networks. In this example, network 608 includes logical connections to facilitate data communication between the content provider 602, the tracking device 604, and the client device 606.

Content provider 602 maintains and provides content 610 that can be any type of data or content provided by a server system. Content 610 is maintained in one or more data storage components (not shown). Content provider 602 can also include the tracking device 604.

Tracking device 604 includes a tracking database 612 that is a data storage component to maintain tracking information. Tracking database 612 can be implemented as RAM (random access memory), a disk drive, a floppy disk drive, a CD-ROM drive, or any other component utilized for data storage. Furthermore, those skilled in the art will recognize that tracking device 604 can implemented as multiple server devices in a distributed computing environment, where each server device can have multiple data storage components.

Tracking device 604 also includes one or more processors 614 to process various instructions to control the operation of the tracking server. An application component 616 executes on processor(s) 614 to process tracking information that will be routed for storage to the tracking database 612.

Client device 606 is connected to a display device 618 which is shown displaying an application user interface 620. The user interface 620 includes a menu bar 622, and is shown having the "Tools" option selected. A drop down menu 624 is shown under the selected "Tools" option. The user interface 620 also includes a rendered content page 626.

The drop down menu 624 includes a selectable data link 628, identified as "Update Content". The selectable data link 628 is a selectable connection that generates a request for content when selected by a user of the client device 606. A request for content is encoded with, or includes, request-tracking information pertaining to selecting the data link 628 in the application user interface 620. The information tracking system 600 can be implemented to obtain tracking information pertaining to the frame work of a product (e.g., application user interface 620), as well as the rendered content 626 itself.

Tracking device 604 receives a content request from client device 606 and application component 616 processes the request. The request-tracking information included with the content request designates that the request be redirected such that tracking device 604 receives the content request before the request is routed, or otherwise communicated, to a designated content provider 602. The request-tracking information is received by tracking device 604 structured as an HTTP URL for a click-thru record that is maintained with tracking database 612. See the description of "Click-thru Tracking" described above for obtaining request-tracking information associated with a content request.

Method for Content and Request Information Tracking

Figure 7:
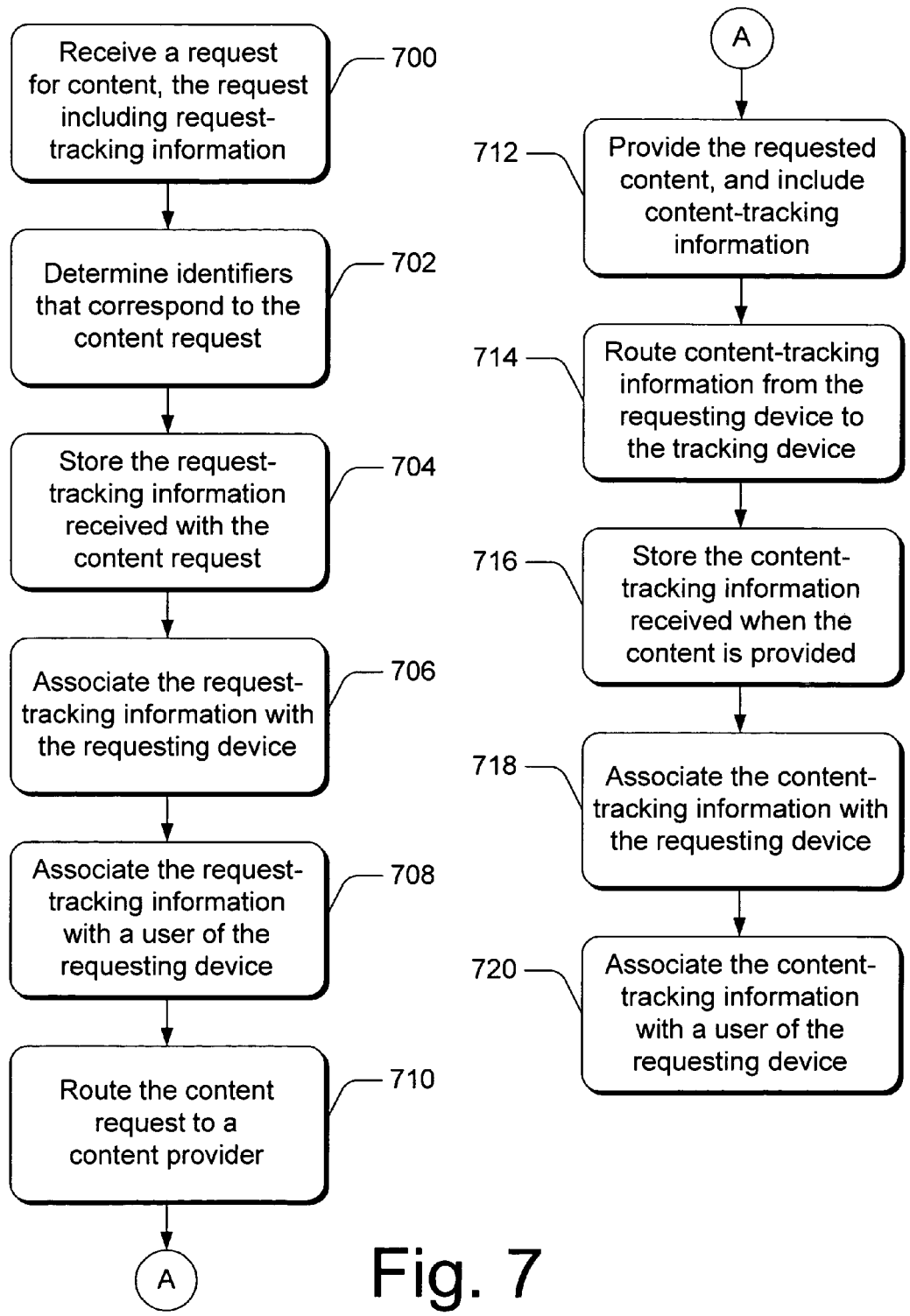
FIG. 7 is a flow diagram of a method for content and request information tracking.

FIG. 7 illustrates a method for content and request information tracking. The order in which the method is described is not intended to be construed as a limitation. Furthermore, the method can be implemented in any suitable hardware, software, firmware, or combination thereof.

At block 700, a request for content is received, and the request includes request-tracking information. The request-tracking information includes identifiers that correspond to the content request. At block 702, a selectable connection identifier, a rendered content identifier, and a location identifier are determined from the request-tracking information. The content request is generated from the selectable connection at the identified location within the rendered content displayed at the requesting device. The selectable connection can be any data link, hyperlink, hypertext link, or the like. The rendered content can include a Web page or an application component user interface displayed at the requesting device.

At block 704, the request-tracking information is stored in a data storage component. For example, a tracking device, or a tracking server, receives the content request and stores the request-tracking information in a database. At block 706, the request-tracking information is associated with the device that requests the content. Alternatively, or additionally, the request-tracking information is associated with a user of the requesting device at block 708. The requesting device is identified in the request-tracking information, and the tracking device can associate the request-tracking information with the requesting device and a user of the device in the database.

At block 710, the content request is routed, or otherwise communicated, to a content provider. In this discussion, the tracking device and the content provider can be the same device. At block 712, the content provider provides the content, including the content-tracking information, to the requesting device. At block 714, the content-tracking information is routed, or otherwise communicated, to the tracking device. The content-tracking information is routed to the tracking device when the content is provided to the requesting device and/or when the content is rendered at the requesting device.

At block 716, the content-tracking information is stored in a data storage component. For example, the tracking device stores the content-tracking information in a database. At block 718, the content-tracking information is associated with the destination device that is provided the content, which, in this discussion is the requesting device. Alternatively, or additionally, the content-tracking information is associated with a user of the requesting device at block 720. The destination device that is provided the content is identified in the content-tracking information, and the tracking device can associate the tracking information with the destination device and a user of the device in the database.

Exemplary Computing System and Environment

Figure 8:
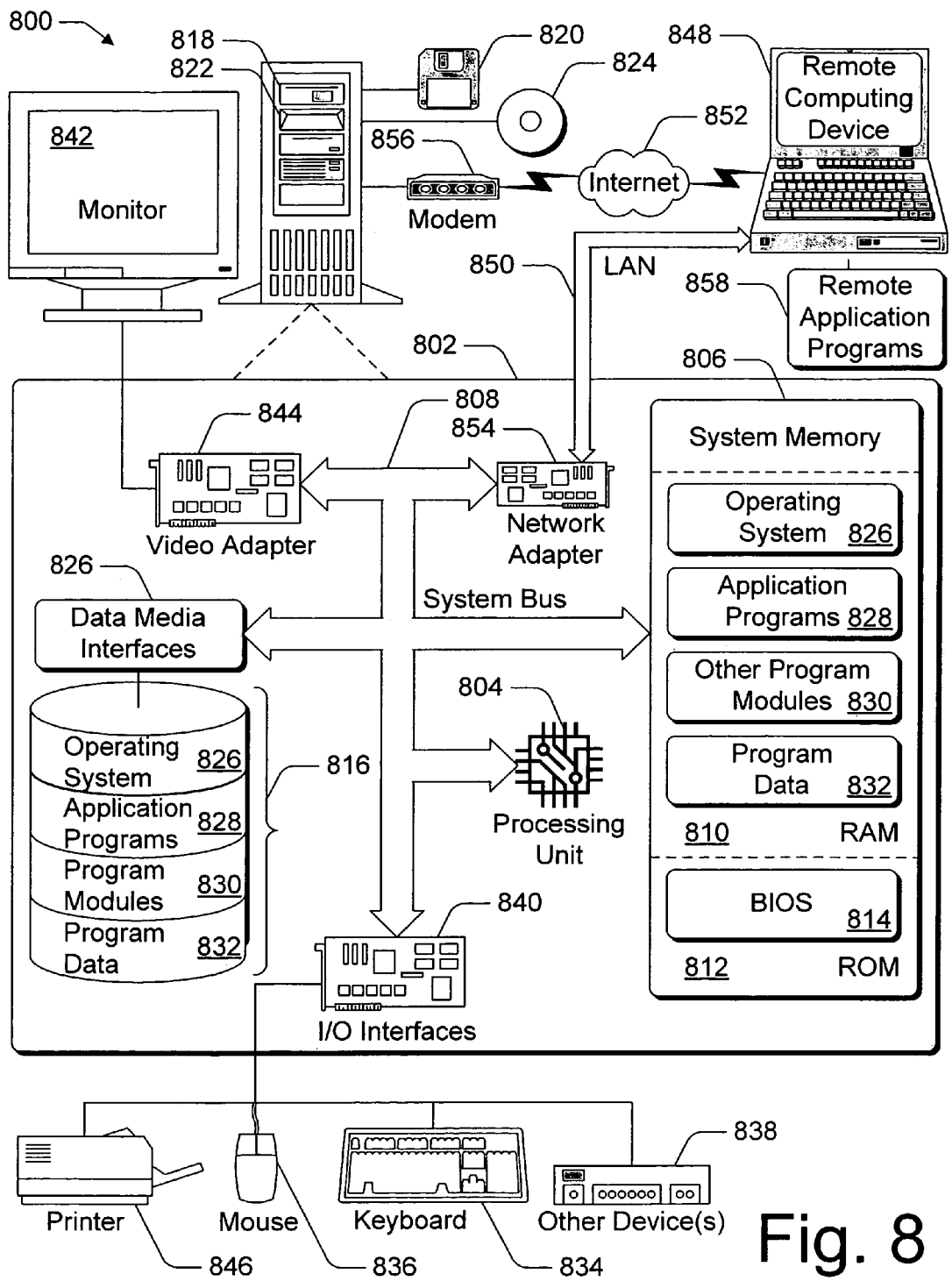
FIG. 8 is a diagram of computing systems, devices, and components in an environment that can be used to implement page-view recording with click-thru tracking as described herein.

FIG. 8 illustrates an example of a computing environment 800 within which the computer, network, and system architectures described herein can be either fully or partially implemented. Exemplary computing environment 800 is only one example of a computing system and is not intended to suggest any limitation as to the scope of use or functionality of the network architectures. Neither should the computing environment 800 be interpreted as having any dependency or requirement relating to any one or combination of components illustrated in the exemplary computing environment 800.

The computer and network architectures can be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, gaming consoles, distributed computing environments that include any of the above systems or devices, and the like.

Page-view recording with click-thu tracking may be described in the general context of computer-executable instructions, such as program modules, being executed by a computer. Generally, program modules include routines, programs, objects, components, data structures, etc. that perform particular tasks or implement particular abstract data types. Page-view recording with click-thu tracking may also be practiced in distributed computing environments where tasks are performed by remote processing devices that are linked through a communications network. In a distributed computing environment, program modules may be located in both local and remote computer storage media including memory storage devices.

The computing environment 800 includes a general-purpose computing system in the form of a computer 802. The components of computer 802 can include, by are not limited to, one or more processors or processing units 804, a system memory 806, and a system bus 808 that couples various system components including the processor 804 to the system memory 806.

The system bus 808 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer system 802 typically includes a variety of computer readable media. Such media can be any available media that is accessible by computer 802 and includes both volatile and non-volatile media, removable and non-removable media. The system memory 806 includes computer readable media in the form of volatile memory, such as random access memory (RAM) 810, and/or non-volatile memory, such as read only memory (ROM) 812. A basic input/output system (BIOS) 814, containing the basic routines that help to transfer information between elements within computer 802, such as during start-up, is stored in ROM 812. RAM 810 typically contains data and/or program modules that are immediately accessible to and/or presently operated on by the processing unit 804.

Computer 802 can also include other removable/non-removable, volatile/non-volatile computer storage media. By way of example, FIG. 8 illustrates a hard disk drive 816 for reading from and writing to a non-removable, non-volatile magnetic media (not shown), a magnetic disk drive 818 for reading from and writing to a removable, non-volatile magnetic disk 820 (e.g., a "floppy disk"), and an optical disk drive 822 for reading from and/or writing to a removable, non-volatile optical disk 824 such as a CD-ROM, DVD-ROM, or other optical media. The hard disk drive 816, magnetic disk drive 818, and optical disk drive 822 are each connected to the system bus 808 by one or more data media interfaces 826. Alternatively, the hard disk drive 816, magnetic disk drive 818, and optical disk drive 822 can be connected to the system bus 808 by a SCSI interface (not shown).

The disk drives and their associated computer-readable media provide non-volatile storage of computer readable instructions, data structures, program modules, and other data for computer 802. Although the example illustrates a hard disk 816, a removable magnetic disk 820, and a removable optical disk 824, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 816, magnetic disk 820, optical disk 824, ROM 812, and/or RAM 810, including by way of example, an operating system 826, one or more application programs 828, other program modules 830, and program data 832. Each of such operating system 826, one or more application programs 828, other program modules 830, and program data 832 (or some combination thereof) may include an embodiment of a page-view recording with click-thu tracking.

Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 802 via input devices such as a keyboard 834 and a pointing device 836 (e.g., a "mouse"). Other input devices 838 (not shown specifically) may include a microphone, joystick, game pad, satellite dish, serial port, scanner, and/or the like. These and other input devices are connected to the processing unit 804 via input/output interfaces 840 that are coupled to the system bus 808, but may be connected by other interface and bus structures, such as a parallel port, game port, or a universal serial bus (USB).

A monitor 842 or other type of display device can also be connected to the system bus 808 via an interface, such as a video adapter 844. In addition to the monitor 842, other output peripheral devices can include components such as speakers (not shown) and a printer 846 which can be connected to computer 802 via the input/output interfaces 840.

Computer 802 can operate in a networked environment using logical connections to one or more remote computers, such as a remote computing device 848. By way of example, the remote computing device 848 can be a personal computer, portable computer, a server, a router, a network computer, a peer device or other common network node, and the like. The remote computing device 848 is illustrated as a portable computer that can include many or all of the elements and features described herein relative to computer system 802.

Logical connections between computer 802 and the remote computer 848 are depicted as a local area network (LAN) 850 and a general wide area network (WAN) 852. Such networking environments are commonplace in offices, enterprise-wide computer networks, intranets, and the Internet. When implemented in a LAN networking environment, the computer 802 is connected to a local network 850 via a network interface or adapter 854. When implemented in a WAN networking environment, the computer 802 typically includes a modem 856 or other means for establishing communications over the wide network 852. The modem 856, which can be internal or external to computer 802, can be connected to the system bus 808 via the input/output interfaces 840 or other appropriate mechanisms. It is to be appreciated that the illustrated network connections are exemplary and that other means of establishing communication link(s) between the computers 802 and 848 can be employed.

In a networked environment, such as that illustrated with computing environment 800, program modules depicted relative to the computer 802, or portions thereof, may be stored in a remote memory storage device. By way of example, remote application programs 858 reside on a memory device of remote computer 848. For purposes of illustration, application programs and other executable program components, such as the operating system, are illustrated herein as discrete blocks, although it is recognized that such programs and components reside at various times in different storage components of the computer system 802, and are executed by the data processor(s) of the computer.

Page-view recording with click-thru tracking provides accurate customer site usage information, and tracking information that identifies which content is being requested, and how and from where the content is being requested. The tracking information can be analyzed to determine how to better design and present content, such as a Web page, that will be rendered for user viewing. Being able to determine not only the content that a viewer sees, but also how a viewer perceives the content is valuable marketing and business information.

Although embodiments of page-view recording with click-thru tracking have been described in language specific to structural features and/or methods, it is to be understood that the subject of the appended claims is not necessarily limited to the specific features or methods described. Rather, the specific features and methods are disclosed as exemplary implementations of the methods and systems for page-view recording with click-thru tracking.

The invention claimed is:

1. A computing system comprising:

means for receiving a request for content from a requesting device, the request comprising request-tracking information relating to the request for content, wherein the request-tracking information comprises a content provider identifier that identifies the content provider and a content identifier that identifies the content;

means for determining from the request-tracking information, a selectable control identifier that identifies a selectable control;

means for redirecting the request for content to a content provider that provides the content to the requesting device, the content comprising content-tracking information relating to providing the content, said redirecting the request for content to the content provider occurring before recording the request-tracking information in an event that the request for content would be delayed for the recording;

means for receiving the content-tracking information from the requesting device; and means for storing the request-tracking information and the content-tracking information, wherein the content-tracking information comprises a content provider identifier that identifies the content provider and a content identifier that identifies the content.

2. A computing system as recited in claim 1, further comprising means for associating the request-tracking information and the content-tracking information with the requesting device.

3. A computing system as recited in claim 1, further comprising means for associating the request-tracking information and the content-tracking information with a user of the requesting device.

4. A computing system as recited in claim 1, wherein the means for receiving the content-tracking information comprises the content-tracking information being received after the content has been provided to the requesting device.

5. A computing system as recited in claim 1, wherein the means for receiving the content-tracking information comprises the content-tracking information being received after the content has been rendered at the requesting device.

6. A computing system as recited in claim 1, wherein the means for storing comprises storing a content provider identifier that identifies the content provider, a requesting device identifier that identifies the requesting device, and a content identifier that identifies the content.

7. A computing system as recited in claim 1, wherein the means for storing comprises storing a content provider identifier that identifies the content provider, a requesting device identifier that identifies the requesting device, a content identifier that identifies the content, and a user identifier that identifies a user of the requesting device.

8. A computing system as recited in claim 1, further comprising means for determining from the request-tracking information a rendered content identifier that identifies rendered content, wherein the request for content is generated from the selectable control within the rendered content at the requesting device.

9. A computing system as recited in claim 1, further comprising means for determining from the request-tracking information a location identifier that identifies a location, wherein the request for content is generated from the selectable control at the identified location within the rendered content at the requesting device.

10. A computing system as recited in claim 1, further comprising means for determining from the request-tracking information a data link identifier that identifies a data link, a Web page identifier that identifies a Web page, and a location identifier for the data link that identifies a location of the data link within the rendered content, wherein the request for content is generated from the data link at the identified location within the Web page at the requesting device.

11. A computing system as recited in claim 1, further comprising means for determining from the request-tracking information, an application component identifier that identifies an application component, and a location identifier that identifies a location, wherein the request for content is generated from the selectable control at the identified location within a user interface for the application component at the requesting device.

12. One or more computer readable media comprising computer executable instructions that, when executed, direct a computing system to perform a method, the method comprising:
receive a request for content from a requesting device, the request for content comprising request-tracking information relating to the request for content;
redirect the request for content to a content provider that provides the content to the requesting device, the content comprising content-tracking information relating to providing the content, the request for content being redirected to the content provider before the tracking information is recorded in an event that the request for content is delayed while being recorded; and
store the request-tracking and content-tracking information and associate the request-tracking and content-tracking information with the requesting device.

13. One or more computer readable media as recited in claim 12, further comprising computer executable instructions that, when executed, direct the computing system to associate the tracking information with a user of the requesting device, and wherein the request-tracking information is encoded.

14. One or more computer readable media as recited in claim 12, further comprising computer executable instructions that, when executed, direct the computing system to store the tracking information, the tracking information comprising a content provider identifier that identifies the content provider, a requesting device identifier that identifies the requesting device, and a content identifier that identifies the content.

15. One or more computer readable media as recited in claim 12, further comprising computer executable instructions that, when executed, direct the computing system to store the tracking information, the tracking information comprising a content provider identifier that identifies the content provider, a requesting device identifier that identifies the requesting device, a content identifier that identifies the content, and a user identifier that identifies a user of the requesting device.

16. One or more computer readable media as recited in claim 12, further comprising computer executable instructions that, when executed, direct the computing system to determine from the tracking information a selectable control identifier that identifies a selectable control and a rendered content identifier that identifies rendered content, wherein the request for content is generated from the selectable control within the rendered content at the requesting device.

17. One or more computer readable media as recited in claim 12, further comprising computer executable instructions that, when executed, direct the computing system to determine from the tracking information a selectable control identifier that identifies a selectable control, a rendered content identifier that identifies rendered content, and a location identifier that identifies a location, wherein the request for content is generated from the selectable control at the identified location within the rendered content at the requesting device.

18. One or more computer readable media as recited in claim 16, further comprising computer executable instructions that, when executed direct the computing system to determine from the tracking information a data link identifier that identifies a data link, a Web page identifier that identifies a Web page, and a location identifier for the data link that identifies a location of the data link within the rendered content, wherein the request for content is generated from the data link at the identified location within the Web page at the requesting device.

19. One or more computer readable media as recited in claim 16, further comprising computer executable instructions that, when executed, direct the computing system to determine from the tracking information a selectable control identifier that identifies a selectable control, an application component identifier that identifies an application component, and a location identifier for the application component that identifies a location of the application component within the rendered content, wherein the request for content is generated from the selectable control at the identified location within a user interface for the application component at the requesting device.

* * * * *